No. 751,881. PATENTED FEB. 9, 1904.
O. S. SWITZER.
COVER ATTACHMENT FOR RECEPTACLES.
APPLICATION FILED AUG. 19, 1903.
NO MODEL.
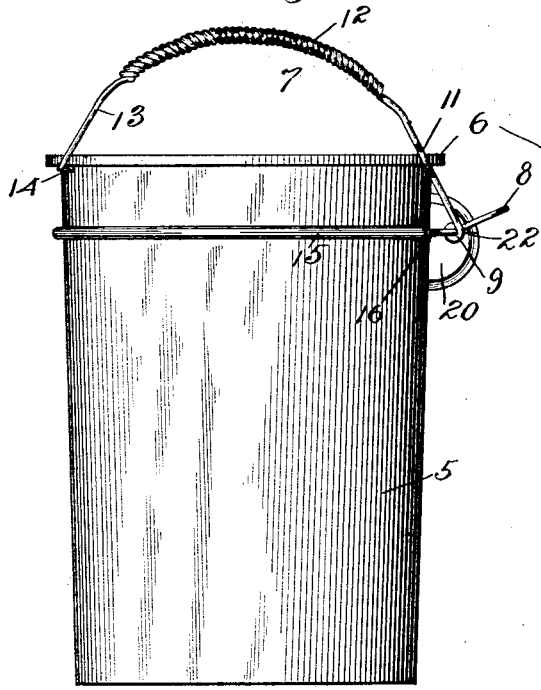
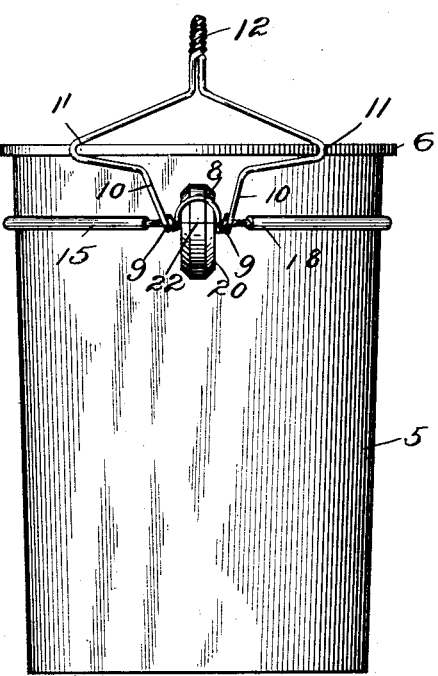
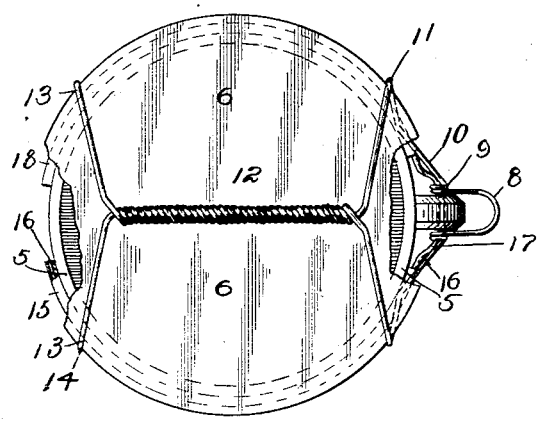
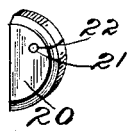
Witnesses:
Ray White.
Harry R. L. White.
Inventor:
Oscar S. Switzer
By Toree Bain Atty.

No. 751,881. Patented February 9, 1904.

UNITED STATES PATENT OFFICE.

OSCAR S. SWITZER, OF CHICAGO, ILLINOIS.

COVER ATTACHMENT FOR RECEPTACLES.

SPECIFICATION forming part of Letters Patent No. 751,881, dated February 9, 1904.

Application filed August 19, 1903. Serial No. 169,976. (No model.)

*To all whom it may concern:*

Be it known that I, OSCAR S. SWITZER, of Chicago, in the county of Cook and State of Illinois, have invented certain new and useful Improvements in Cover Attachments for Receptacles; and I hereby declare that the following is a full, clear, and exact description thereof, reference being had to the accompanying drawings, which form part of this specification.

The primary object of my invention is to provide a cover attachment for receptacles which may be quickly applied to open-ended receptacles and readily removed therefrom.

A further object of my invention is to so arrange the cover proper relative to the attaching member that said cover may be moved to open and close the receptacle without removing said attaching devices therefrom.

A further object of my invention is to provide a device of the character described in which the cover proper is itself removable from the associated devices employed in attaching it to the receptacle.

A still further object of my invention is to provide a simple, cheap, and efficient cover attachment for receptacles which when attached to the receptacle will not become displaced under ordinary conditions of use.

With a view to attaining these and further objects, which will become apparent from the following description, my invention consists in the combinations of parts and features of construction hereinafter more particularly pointed out, and specified in the claims.

In the drawings, Figure 1 is a side elevation of a receptacle equipped with a removable cover attachment embodying my invention. Fig. 2 is a similar view taken from the right side of Fig. 1. Fig. 3 is a top plan view of the same, parts of the cover proper being broken away. Fig. 4 is a detail of a friction-block.

Referring now to said drawings, wherein like numerals of reference refer always to like parts, 5 indicates a receptacle having an open top. 6 indicates the cover proper therefor, preferably a flat plate of such size as to cover the receptacle 5, and extends a short distance therebeyond at suitable points or throughout its perimeter.

Associated with the cover 6 are a suitable carrier member, to which the said cover is secured, and an attaching-clip, relative to which the carrier member is hinged, said clip being designed to be detachably secured to the receptacle. In the specific embodiment of my invention herein illustrated the carrier member comprises a single piece of spring-wire contorted as follows: The wire is centrally doubled back upon itself to form a U-shaped loop 8, on opposite sides of which the wire is symmetrically shaped, being on each side twisted into an open coil 9, whence it extends substantially at right angles to the plane of the loop 8 a suitable distance, as indicated at 10, thence outwardly and then reëntrantly bent to form an inwardly-opening loop 11, designed to receive the edge of cover 6, then brought back and up to a central point in a plane above the level of cover 6 and intertwisted with the opposite side of the wire for a suitable distance, as at 12, then bent outwardly and downwardly, as at 13, and then bent sharply in at its end to form an inwardly-open cover-receiving loop 14 in a plane including loops 11 and substantially parallel with the loop 8. The carrier thus constituted comprises, essentially, a series of spring-fingers provided with inwardly-open cover-receiving loops 11 and 14, arranged in a single plane, a hinge member provided by coils 9, and a projection in the plane of the hinge member substantially parallel to the plane of the cover-receiving loops.

In assembling the parts the cover 6 is slipped into the open loops 11 and 14 and is firmly held at a sufficient number of points to positively position it in the carrier. Obviously, however, the said cover may be readily removed by springing the carrier-fingers slightly apart.

The hinge member coacting with the hinge-coils 9 is carried by the attaching device. In the specific embodiment of the invention herein shown said attaching-clip comprises a wire 16 of a resilient material bent to form an open spring of substantially the same configuration as the perimeter of the receptacle, to which it is designed to be attached, and provided at a point intermediate its ends with an offset portion 17. Said offset portion 17 is preferably just wide enough to receive the hinge-coils 9 of the spring-carrier and is threaded through said coils 9 to form the pintle of the hinge. If preferred, the portions of the wire 16 which contact with the receptacle may be covered with a suitable substance having good frictional qualities—such, for example, as rubber tubing 18—which may be vulcanized thereto or simply slipped thereon, as desired.

Associated with the attaching-clip 15 I prefer to employ a friction-block 20, the bearing-face of which is of material having good frictional qualities, such as rubber, arranged and so shaped as to present a relatively long vertical bearing against the receptacle adjacent the point whereon the strain falls in raising and lowering the cover. Preferably the block 20 is formed entirely of rubber having flat sides and a flat bearing edge and having its opposite edge curved. The block is of less width than the distance between hinge-coils 9 of the carrier and is mounted on the offset 17 between the said coils 9. For convenience of attachment the block 20 may be apertured, as at 21, to receive the clip-wire and provided with a slot 22, leading from said aperture to the exterior edge of the block at a point remote from the bearing-face, through which the clip-wire may be forced into the aperture 21.

In the use of my invention, the cover proper being in place on the carrier, the attaching-clip is simply spread somewhat and slipped upon the receptacle at a proper point and then its arms are allowed to spring inward, so that they tightly clasp the receptacle. In jars and the like having grooves wherein the clip-wires may be fitted it will be found unnecessary to employ any friction devices for maintaining the clip against vertical movement upon the receptacle when the closure is being operated. Upon smooth vessels, such as jelly-glasses and the like, I prefer to employ the friction-blocks in the manner illustrated, such block when in place being with its flat edge against the side of the glass. It will be apparent that the said block affords a long vertical bearing at the pivotal point at which the strain, due to the weight of the cover and the lifting effort, is thrown when the cover is being raised and will prevent the slippage of the clip at the said point. It will be obvious that the block 20 should be so proportioned as not to interfere with the loop 8 in the desired throw of the hinged cover. It will also be apparent that in use either the loop 8 of the bow 12 of the carrier may be used as a handle to prevent the hands of the user touching the cover proper and that the cover may be thrown back until the loop 8, which forms a stop, strikes some relatively fixed portion of the attachment or, as in the present instance, the receptacle 5.

It will be apparent that either the block 20 or the coverings 18 of the clip 15, or both, may be omitted without departing from the spirit of my invention; but I find it advantageous to use the construction herein illustrated and described.

In the manufacture of my cover attachment the spring-carrier 7 and clip 15 will preferably be assembled and may be sold with or without the cover proper, 6, or the friction-block 20.

It will be apparent that any cover of approximately the size of the top of the receptacle for which the clip is best adapted may be inserted in the carrier, as its yielding construction gives it a wide latitude of play.

While I have herein for purposes of a full disclosure described in some detail one specific embodiment of my invention, I do not desire to be understood as limiting myself thereto, as it is apparent that numerous structural changes might be made in its embodiment without departing from the spirit and scope of my invention.

Having described my invention, what I claim, and desire to secure by Letters Patent of the United States, is—

1. A cover attachment for open-ended receptacles comprising a spring-clip adapted to be clasped about the receptacle intermediate its ends, a cover proper for the receptacle, and a carrier, separable from the cover, attached thereto, and extending down the side of the receptacle into pivotal engagement with the clip.

2. A cover attachment for open-ended receptacles comprising a spring-clip adapted to be clasped about the receptacle, and having a portion constituting one member of a hinge, a cover proper for the receptacle, and a carrier, separable from and attached to the cover, having a portion closely encircling the clip to form the other member of a hinge.

3. In a cover attachment for receptacles, an attaching member provided with one element of a hinge, a carrier provided with the coacting element of the hinge, and a cover detachably mounted in said carrier.

4. In a device of the character described, an attaching member provided with one element of a hinge, and a carrier member provided with the coacting element of the hinge, said carrier element being provided with a plurality of inwardly-opening loops arranged in a single plane.

5. In a cover attachment for receptacles, an attaching member designed to be detachably secured to said receptacle, and provided with one element of a hinge, a carrier provided with the coacting element of the hinge, said carrier comprising a plurality of divergent spring-fingers, provided with inwardly-opening loops arranged in a common plane.

6. In a cover attachment for receptacles, an attaching-clip, a cover-carrier pivotally mounted on said clip, and a bearing member adapted to contact with the receptacle carried by the clip, and arranged adjacent the pivotal point of the carrier.

7. In combination with an open-ended receptacle, a cover attachment therefor comprising a spring-attaching clip, a cover-carrier hinged thereto, and a bearing-block having a friction-face carried by the clip and arranged to extend below the point where the carrier is hinged, in contact with the receptacle.

In testimony that I claim the foregoing as my own I affix my signature in presence of two witnesses.

OSCAR S. SWITZER.

In presence of—
 MARY F. ALLEN,
 GEORGE T. MAY, Jr.